United States Patent
Shibutani et al.

(10) Patent No.: US 10,050,281 B2
(45) Date of Patent: Aug. 14, 2018

(54) METHOD FOR MANUFACTURING MEMBRANE ELECTRODE ASSEMBLY

(71) Applicant: Honda Motor Co., LTD., Tokyo (JP)

(72) Inventors: Tomohide Shibutani, Tochigi (JP); Yoshinori Kawamura, Tochigi (JP); Hiroshi Kurata, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 364 days.

(21) Appl. No.: 15/063,812

(22) Filed: Mar. 8, 2016

(65) Prior Publication Data

US 2016/0268617 A1    Sep. 15, 2016

(30) Foreign Application Priority Data

Mar. 10, 2015  (JP) ................... 2015-047652

(51) Int. Cl.
  *H01M 4/10*   (2006.01)
  *H01M 4/88*   (2006.01)
  *H01M 8/1018* (2016.01)

(52) U.S. Cl.
  CPC .. *H01M 4/8814* (2013.01); *H01M 2008/1095* (2013.01)

(58) Field of Classification Search
  CPC ............. H01M 8/1004; H01M 8/1018; H01M 8/1069; H01M 4/8814; H01M 4/8875; H01M 4/8896; H01M 2008/1095; Y02P 70/56
  See application file for complete search history.

(56) References Cited

U.S. PATENT DOCUMENTS

2004/0241525 A1* 12/2004 Mekala ............... H01M 4/8828
                                                   156/263
2013/0101917 A1*  4/2013 Okanishi ............. H01M 8/1004
                                                   429/480

FOREIGN PATENT DOCUMENTS

JP          2014-067483          4/2014

* cited by examiner

*Primary Examiner* — Stephen J Yanchuk
(74) *Attorney, Agent, or Firm* — Rankin, Hill & Clark LLP (57) ABSTRACT

Disclosed is a method for manufacturing a membrane electrode assembly wherein a fuel cell electrode layer is formed on a material and is transferred to a fuel cell electrolyte membrane. The method includes the steps of: forming a fuel cell electrode layer on a first substrate layer; cutting from the fuel cell electrode layer side using cutting means so as to reach a second substrate layer, and forming a cut of a predetermined shape in the fuel cell electrode layer and the first substrate layer; and a removal step for peeling off an outer side portion of the predetermined shape from the second substrate layer.

2 Claims, 7 Drawing Sheets

METHOD FOR MANUFACTURING MEMBRANE ELECTRODE ASSEMBLY

FIELD OF THE INVENTION

The present invention relates to a method for manufacturing a membrane electrode assembly used in a fuel cell.

BACKGROUND OF THE INVENTION

Engines in which gasoline is used as a fuel, motors driven by electricity, and hybridized engine/motor combinations are used as power sources in automotive vehicles. Recently, fuel cell vehicles, in which a motor that is driven using electricity generated by a fuel cell, have been attracting attention due to environmental considerations. A fuel cell is an apparatus that supplies air and hydrogen to a membrane electrode assembly configured having an anode and a cathode with an electrolyte membrane interposed therebetween to generate electrical energy and water. The following method has been proposed for manufacturing membrane electrode assemblies employed in such fuel cells.

Figure 5A:
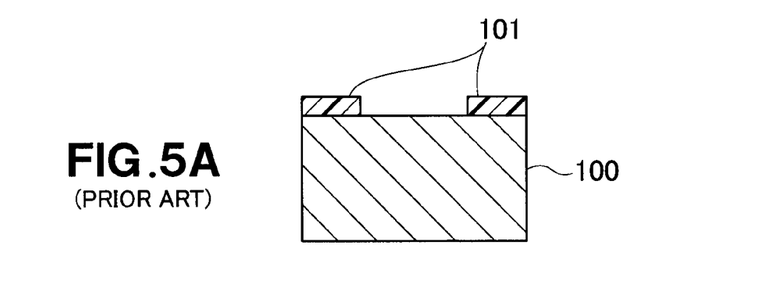
FIG. 5A to FIG. 5D are views illustrating conventional substrate preparation to transfer steps.
Figure 5B:
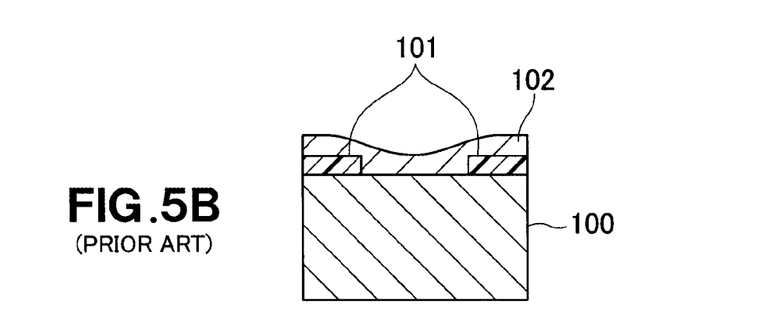

As shown in FIG. 5A, a mask 101 that has been cut to a predetermined shape is disposed on a substrate 100, and as shown in FIG. 5B, an electrode layer paste 102 to become an electrode layer is applied to the substrate 100. The substrate 100 and mask 101 covered with the electrode layer paste 102 are placed inside a dryer, and dried at a predetermined temperature. The drying causes the electrode layer paste 102 to solidify.

Figure 5C:
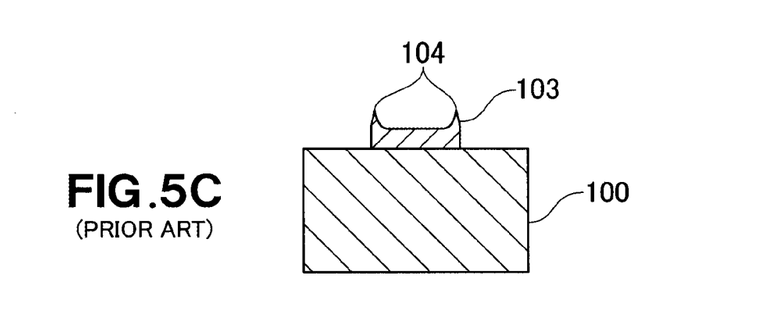

Next, the mask 101 is peeled from the substrate 100. As shown in FIG. 5C, a solid electrode layer 103 of predetermined shape is obtained. At this point, when the mask 101 is peeled from the substrate 100 after the electrode layer paste 102 has solidified, sharply peaked protuberant configurations 104 are formed on the outer peripheral edge of the electrode layer 103.

Figure 5D:
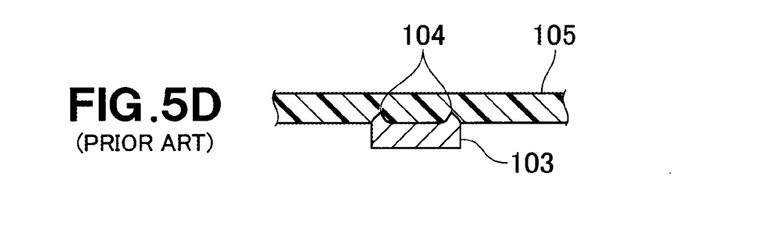

As shown in FIG. 5D, the electrode layer 103 is transferred to one surface of an electrolyte membrane 105 using thermocompression bonding. A membrane electrode assembly is obtained by transferring an electrode layer in the same way to the other surface of the electrolyte membrane 105 using thermocompression bonding, and forming gas diffusion layers on the electrode layers on the both surfaces [of the electrolyte membrane 105. However, when the electrode layer 103 on which the protuberant configurations 104 are formed is transferred to the electrolyte membrane 105, the protuberant configurations 104 penetrate the electrolyte membrane 105 and damage the electrolyte membrane 105. Various methods for manufacturing membrane electrode assemblies that address such drawbacks have been proposed (e.g. Japanese Patent Application Laid-Open Publication No. 2014-67483).

Figures 6A, 6B, 6C, 6D, 6E, 6F, 6G, 6H, 6I:
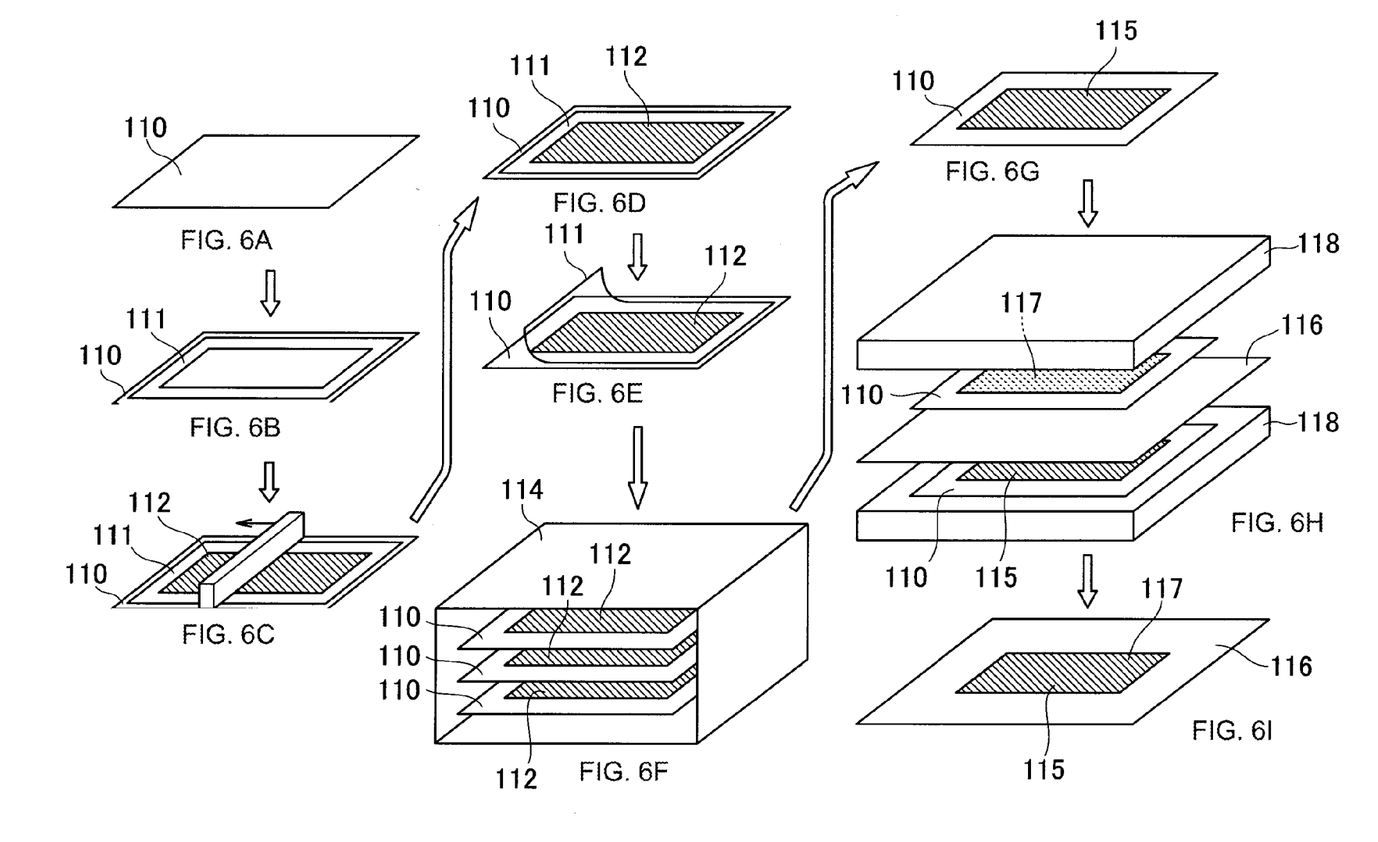
FIGS. 6A-6I schematically illustrate a flow of a conventional method for manufacturing a membrane electrode assembly.

As shown in FIG. 6A, a rectangular substrate 110 is prepared, and as shown in FIG. 6B, a mask 111 that has been cut in a predetermined shape is disposed on the substrate 110. As shown in FIG. 6C, an electrode layer paste 112 is applied to the substrate 110, and as shown in FIG. 6D, partial drying is performed by leaving the substrate 110 in a hot chamber to make the electrode layer paste 112 a semi-solid. Partial drying is performed so that that electrode layer paste 112 will have sufficient viscosity to retain its shape when the mask is removed. As shown in FIG. 6E, the mask 111 is peeled from the substrate 110 while the electrode layer paste 112 impregnated with a solvent is wet. By removing the mask 111, the outer peripheral edge part of the electrode layer paste 112 is also removed, and the electrode layer paste 112 assumes the desired shape.

Figure 7:
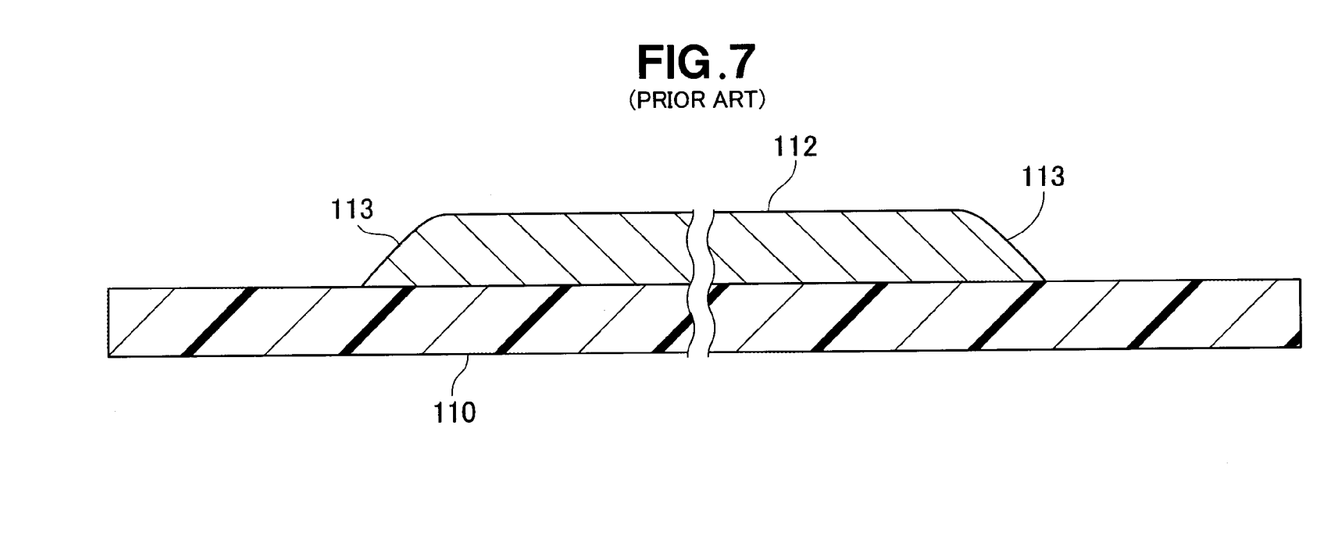
FIG. 7 is a cross-section illustrating major elements of a conventional substrate and electrode layer with a mask removed.

As shown in FIG. 7, the outer peripheral edge part 113 of the electrode layer paste 112, being in a partially dry state, flows toward the outer periphery under gravity, and slants to a taper so as to decrease in thickness toward the outer periphery.

Next, as shown in FIG. 6F, the electrode layer paste 112 is placed in a dryer 114 together with the substrate 110 and fully dried, and, as shown in FIG. 6G, an electrode layer 115 that has formed into a solid on the substrate 110 is obtained. As shown in FIG. 6H, substrates 110, 110 having the electrolyte membrane 116 therebetween are thermocompression bonded by a press machine 118 so that the electrode layer 115 on the anode side and an electrode layer 117 on the cathode side make contact with the electrolyte membrane 116. As shown in FIG. 6I, peeling the substrates 110, 110 from the electrode layers 115, 117 yields an electrolyte membrane 116 on which the electrode layers 115, 117 are disposed on both surfaces.

However, because the mask 111 is removed while the electrode layer paste 112 is wet (semi-solid), the outer peripheral edge of the electrode layers 115, 117 may change slightly in shape. Accordingly, a method is required for manufacturing a membrane electrode assembly that enables the shape of the electrode layer to be formed accurately without mechanically damaging the electrolyte membrane.

SUMMARY OF THE INVENTION

The present invention addresses the problem of providing a method for manufacturing a membrane electrode assembly that enables the shape of the electrode layer to be formed accurately without causing mechanical damage to the fuel cell electrolyte membrane.

According to the present invention, there is provided a method for manufacturing a membrane electrode assembly in which a fuel cell electrode layer is formed on a substrate, and the fuel cell electrode layer is transferred to a fuel cell electrolyte membrane, which the method comprises: a substrate preparation step for preparing the substrate, in which a first substrate layer and a second substrate layer are laminated with a primary adhesive layer interposed therebetween; an electrode layer formation step for forming the fuel cell electrode layer on the first substrate layer; a cutting step for cutting, using cutting means, from the fuel cell electrode layer side so as to reach the second substrate layer, and forming a cut of a predetermined shape in the fuel cell electrode layer and the first substrate layer; a removal step for peeling off an outer side portion of the predetermined shape from the second substrate layer; and a transfer step for transferring the fuel cell electrode layer of predetermined shape from the substrate to the fuel cell electrolyte membrane.

In the thus-arranged invention, a substrate is prepared in which a first substrate layer and a second substrate layer are laminated with a primary adhesive layer interposed therebetween, and a fuel cell electrode layer is formed on the first substrate layer. Cutting is performed from the fuel cell electrode layer side using cutting means so as to reach the second substrate layer to form a cut of a predetermined shape in the fuel cell electrode layer and the first substrate layer. When an outer side portion of the predetermined shape is peeled off from the second substrate layer, the fuel cell electrode layer and the first substrate layer are peeled together from the second substrate layer, and accordingly there is no incidence of just the fuel cell electrode layer being sheared by the edge of the mask and protuberant configurations being formed on the outer peripheral edge of the electrode layer, as in the prior art. As a result, when the fuel cell electrode layer is transferred to the fuel cell electrolyte membrane, the outer peripheral edge of the electrode layer does not penetrate the fuel cell electrolyte membrane, and no mechanical damage is done to the fuel cell electrolyte membrane. Further, because the cutting is performed using cutting means after the fuel cell electrode layer has been dried and formed into a solid, the shape of the electrode layer can be formed accurately without the outer peripheral edge part of the partially dried electrode layer paste gravitationally flowing toward the outer periphery as in the prior art.

Preferably, a first auxiliary substrate layer and a second auxiliary substrate layer of the first substrate layer are pasted together with auxiliary adhesive layer interposed therebetween, and the adhesive strength of the auxiliary adhesive layer is greater than the adhesive strength of the primary adhesive layer. Since the adhesive strength of the auxiliary adhesive layer is greater than the adhesive strength of the primary adhesive layer between the second auxiliary substrate layer and the second substrate layer, the second auxiliary substrate layer can be easily peeled from the backup second substrate layer.

DETAILED DESCRIPTION OF THE PREFERRED EMBODIMENTS

Figure 1:
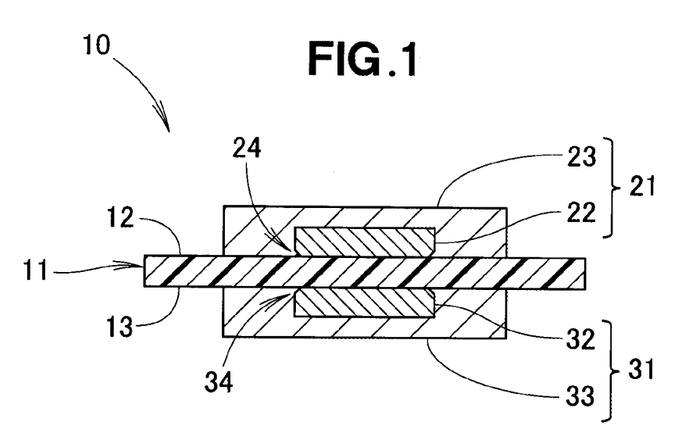
FIG. 1 is a schematic cross-sectional view illustrating a membrane electrode assembly according to the present invention.

As shown in FIG. 1, the membrane electrode assembly 10 employed in a fuel cell comprises a fuel cell electrolyte membrane 11, an anode 21 disposed on one surface 12 of the fuel cell electrolyte membrane 11, and a cathode 31 disposed on the other surface 13 of the fuel cell electrolyte membrane 11. The fuel cell electrolyte membrane 11 is, for example, a polymer electrolyte membrane in which a perfluorosulfonic acid thin film is impregnated with water.

The area of the fuel cell electrolyte membrane 11 is set larger than the areas of the anode 21 and the cathode 31, but may be set to be the same as the areas of the anode 21 and the cathode 31. Further, the area of the anode 21 and the area of the cathode 31 may be different.

The anode 21 is configured from a first fuel cell electrode layer 22 disposed on the one surface 12 of the fuel cell electrolyte membrane 11, and a first gas diffusion layer 23 disposed so as to cover the first fuel cell electrode layer 22. The cathode 31 is configured from a second fuel cell electrode layer 32 disposed on the other surface 13 of the fuel cell electrolyte membrane 11, and a second gas diffusion layer 33 disposed so as to cover the second fuel cell electrode layer 23.

The first fuel cell electrode layer 22 and the second fuel cell electrode layer 32 are obtained, for example, by preparing an electrode layer slurry comprising carbon that supports a catalyst made of platinum particles or the like, a polymer electrolyte, a solvent (water, alcohol, or a mixture thereof), and carbon fiber; applying the slurry to a transfer substrate; and thermocompression bonding the coated substrate to the polymer electrolyte membrane layer (described in detail below). The slurry is obtained by mechanically mixing the solids and liquids and obtaining a fluidized body. The first gas diffusion layer 23 and the second gas diffusion layer 33 comprise, for example, carbon paper or carbon cloth.

An outer peripheral edge 24 of the first fuel cell electrode layer 22 is positioned on the one surface 12 without penetrating the fuel cell electrolyte membrane 11. An outer peripheral edge 34 of the second fuel cell electrode layer 32 is positioned on the other surface 13 without penetrating the fuel cell electrolyte membrane 11. The shapes of the outer peripheral edge 24 of the first fuel cell electrode layer 22 and the fuel cell electrolyte membrane 11 are exaggerated for the sake of convenience. Further, hereinafter as well, descriptions will be given using diagrams in which the shapes of the fuel cell electrolyte membrane 11, the first fuel cell electrode layer 22, and so forth have been exaggerated.

Next, a description of the substrate preparation step to the transfer step will be given.

Figure 2A:
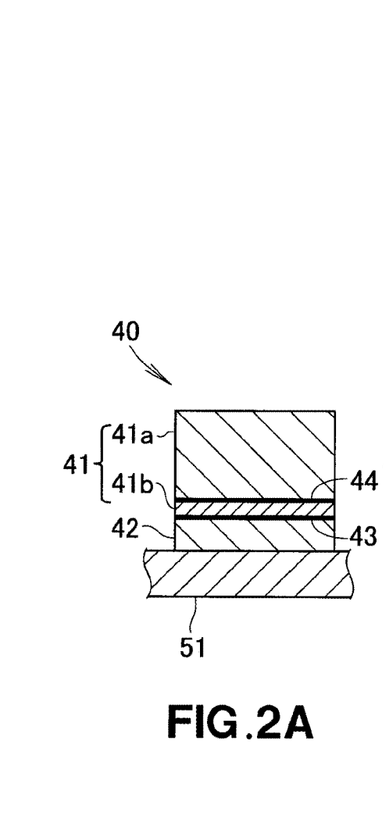
FIGS. 2A-2D are views illustrating a substrate preparation step to a transfer step.

As shown in FIG. 2A, a first substrate layer 41 that serves as the transfer substrate and a second substrate layer 42 that serves as a backup substrate are laminated with a primary adhesive layer 43 interposed therebetween, and a substrate 40 is obtained. The substrate 40 is prepared on a base 51 (substrate preparation step).

In the first substrate layer 41, a first auxiliary substrate layer 41a and a second auxiliary substrate layer 41b are pasted together with an auxiliary adhesive layer 44 interposed therebetween. The adhesive strength of the auxiliary adhesive layer 44 is greater than the adhesive strength of the primary adhesive layer 43. Therefore, in the removal step, which will be described below, the second auxiliary substrate layer 41b can be easily peeled from the backup second substrate layer 42.

Figure 2B:
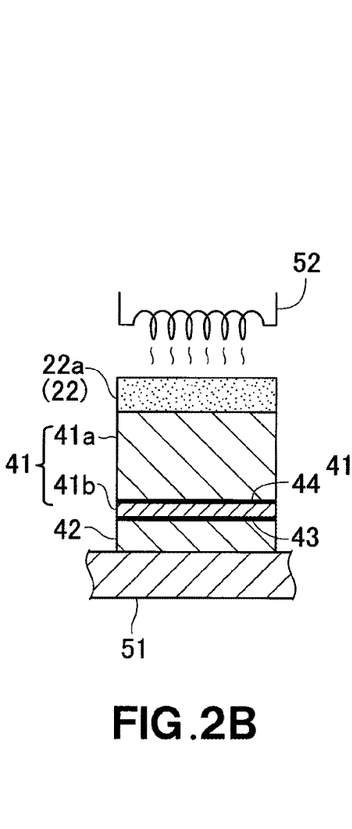

As shown in FIG. 2B, an electrode layer slurry 22a comprising carbon that supports a catalyst made of platinum particles or the like, a polymer electrolyte, a solvent, and carbon fiber is prepared and applied on the first substrate layer 41 of the substrate 40. The electrode layer slurry 22a is dried together with the substrate 40 using drying means 52. Thus, the first fuel cell electrode layer 22 is formed on the first substrate layer 41 (electrode layer formation step).

Furthermore, the electrode layer slurry 22a that has been dried to a solid is used as the fuel cell electrode layer 22.

Figure 2C:
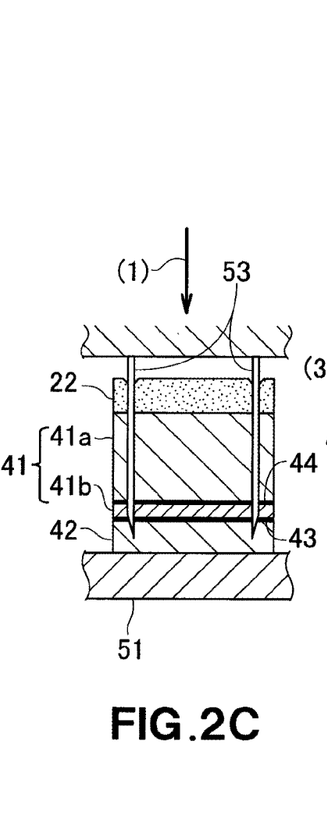

As shown in FIG. 2C, cutting means 53, which is disposed so as to be capable of moving relatively with respect to the base 51, is prepared. The cutting means 53 is made to move as indicated by arrow (1), and cuts from the first fuel cell electrode layer 22 side so as to reach partway through the second substrate layer 42. As a result, predetermined cuts are formed in the first fuel cell electrode layer 22 and the first substrate layer 41 (cutting step).

By cutting from the first fuel cell electrode layer 22 side using the cutting means 53, top parts of the cutting surface of the first fuel cell electrode layer 22 are penetrated and caused to curve slightly downwardly in the drawing. When the first fuel cell electrode layer 22 is to be transferred to the fuel cell electrolyte membrane 11 (refer to FIG. 1), the curved part side of the first fuel cell electrode layer 22 come in contact with the fuel cell electrolyte membrane 11, making it possible to further reduce the mechanical damage caused to the fuel cell electrolyte membrane 11.

Figure 2D:
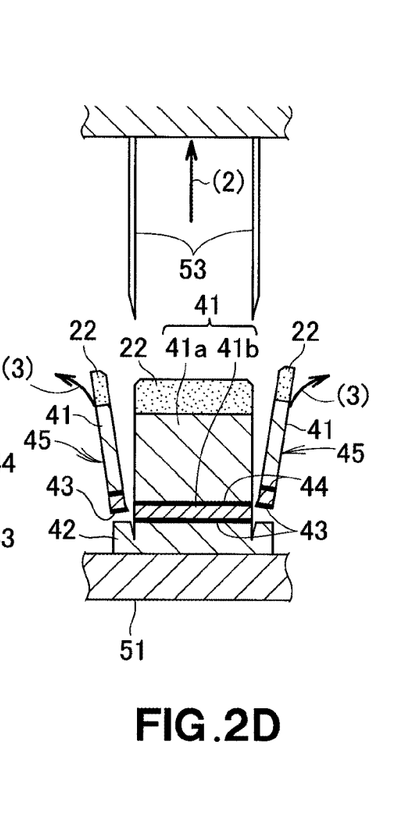

As shown in FIG. 2D, the cutting means 53 is retracted as indicated by arrow (2). Outer side portions 45, 45 of a predetermined shape are peeled off from the second substrate layer 42 as indicated by arrows (3) (removal step).

Thus, the predetermined-shape outer side portions 45, 45 are peeled from the second substrate layer 42. Since the first fuel cell electrode layer 22 and the first substrate layer 41 are peeled off together from the second substrate layer 42, there is no incidence of just the fuel cell electrode layer being sheared by the edge of the mask and protuberant configurations being formed on the outer peripheral edge of the electrode layer, as in the prior art. As a result, when the first fuel cell electrode layer 22 is transferred to the fuel cell electrolyte membrane 11 (refer to FIG. 1), the outer peripheral edge 24 of the first fuel cell electrode layer 22 does not penetrate the fuel cell electrolyte membrane 11, making it possible to prevent the fuel cell electrolyte membrane 11 from experiencing mechanical damage.

Further, because the cutting is performed using the cutting means 53 after the first fuel cell electrode layer 22 has been dried and formed into a solid, the shape of the outer peripheral edge of the first fuel cell electrode layer 22 can be accurately formed without the outer peripheral edge part of the partially dried electrode layer paste gravitationally flowing toward the outer periphery as in the prior art. A substrate on which the second fuel cell electrode layer 32 (refer to FIG. 1) is formed is obtained in the same manner.

Next, likewise with respect to the prior art shown in FIG. 6(*h*), substrates 40 are positioned on either side of the fuel cell electrolyte membrane 11, and the assembly is thermocompression bonded by a press machine so that the first fuel electrode layer 22 of the anode side and the second fuel cell electrode layer 32 of the cathode side make contact with the fuel cell electrolyte membrane 11. When the first substrate 41 is peeled from the first fuel cell electrode layer 22 and the second fuel cell electrode layer 32 after the press machine has been retracted, the fuel cell electrolyte membrane 11 having the first fuel cell electrode layer 22 and the second fuel cell electrode layer 32 disposed on both surfaces is obtained (transfer step).

In addition, the membrane electrode assembly 10 (refer to FIG. 1) is obtained by forming the first gas diffusion layer 23 on the first fuel cell electrode layer 22 side, and forming the second gas diffusion layer 33 on the second fuel cell electrode layer 32 side. In the present invention, the workload can be reduced since drying requires only one step, not the two drying steps as in the prior art; i.e. partial drying and full drying. Further, since the mechanical damage to the fuel cell electrolyte membrane 11 is reduced, it is possible to manufacture an exceptionally durable fuel cell exhibiting minimal incidence of "cross leaking."

Next, the operation of a fuel cell in which the above-described membrane electrode assembly 10 is employed will be described.

Figure 3:
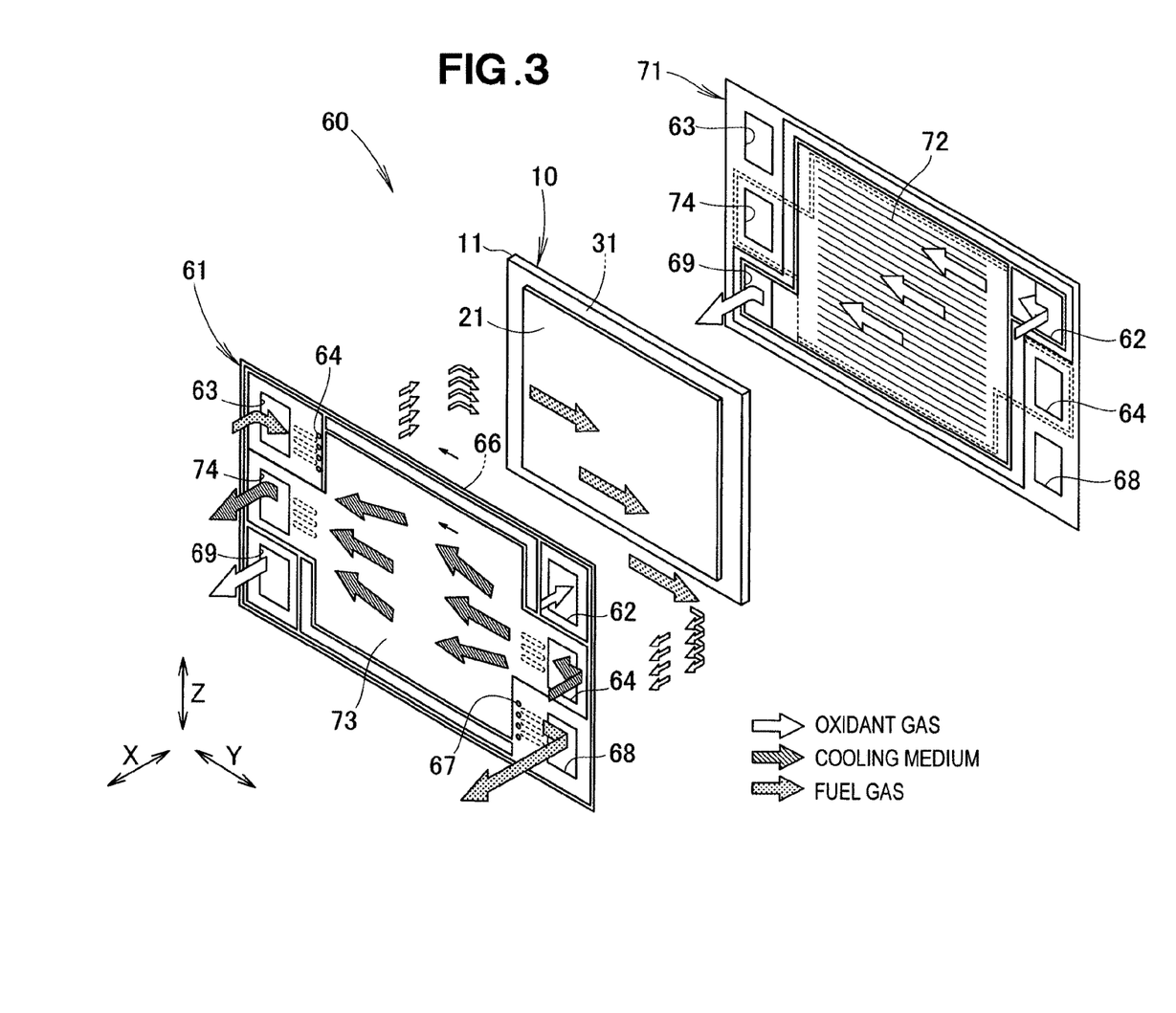
FIG. 3 is an exploded perspective view illustrating features of a unit cell constituting a fuel cell.

As shown in FIG. 3, the unit cell 60 that constitutes the fuel cell includes the fuel cell electrolyte membrane 11, and a separator 61 and a second separator 71 disposed on both sides of the fuel cell electrolyte membrane 11. For the sake of convenience, the unit cell 60 will be explained using an exploded perspective view. An oxidant gas, such as air, is supplied to an oxidant gas inlet communication hole 62, and a fuel gas, such as hydrogen, is supplied to a fuel gas inlet communication hole 63. In addition, a cooling medium, such as pure water, ethylene glycol, oil, or the like, is supplied to a cooling medium inlet communication hole 64.

The fuel gas is introduced from the fuel gas inlet communication hole 63 into a fuel gas flow channel 66 of the first separator 61 through a supply hole part 46, and thereafter, moves along the fuel gas flow channel 66 in the direction of the Y arrow and is supplied to the anode 21 of the membrane electrode assembly 10. In the anode 21, the fuel gas passes through the first gas diffusion layer 23 (refer to FIG. 1) while being diffused, and reaches the first fuel cell electrode layer 22.

Thereafter, the hydrogen in the fuel gas is ionized in the first fuel cell electrode layer 22 and a reaction in which protons are generated occurs. The protons move to the second fuel cell electrode layer 32 of the cathode 31 (refer to FIG. 1) by the proton conduction of the fuel cell electrolyte membrane 11. Electrons are used as a source of electrical energy for energizing an external load electrically connected to a solid polymer fuel cell.

Meanwhile, the oxidant gas is introduced from the oxidant gas inlet communication hole 62 to an oxidant gas flow channel 72 of the second separator 71, moves in the direction of the Y arrow, and is supplied to the cathode 31 of the membrane electrode assembly 10.

In the cathode 31, the oxidant gas passes through the second gas diffusion layer 33 (refer to FIG. 1) while being diffused, and reaches the second fuel cell electrode layer 23. Thereafter, in the second fuel cell electrode layer 23, the oxygen in the oxidant gas, the protons that have moved through the fuel cell electrolyte membrane 11, and the electrons that have reached the cathode 31 by energizing the external load undergo a reaction and produce water.

The fuel gas that was supplied to the anode 21 and consumed passes through an exhaust hole part 67 and exhausts in the direction of the X arrow along a fuel gas outlet communication hole 68. Similarly, the oxidant gas supplied to the cathode 31 and consumed exhausts in the direction of the X arrow along an oxidant gas outlet communication hole 69.

While electricity is being generated as described above, a cooling medium is supplied through a cooling medium inlet communication hole 64 to a cooling medium flow channel 73 between the first separator 61 and the second separator 71. The cooling medium, after cooling the membrane electrode assembly 10 by flowing in the direction of the Y arrow, exhausts via a cooling medium outlet communication hole 74.

Next, another mode of FIG. 2 will be described on the basis of the drawings. The same reference signs are assigned to structures that are the same as the structures shown in FIG. 2, and detailed descriptions thereof will be omitted.

Figure 4A:
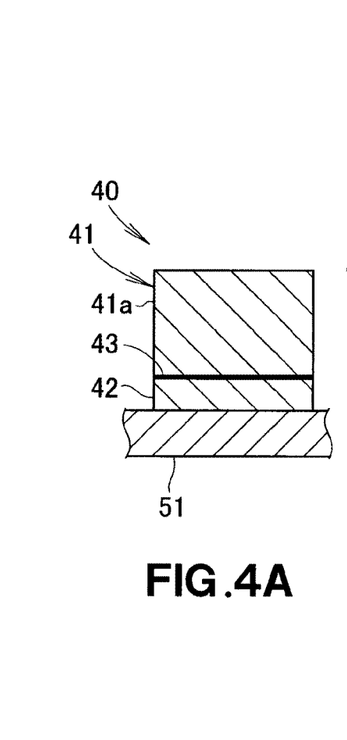
FIG. 4A to FIG. 4D are views illustrating another mode of FIG. 2.

As shown in FIG. 4A, a first substrate layer 41 that serves as a transfer substrate and a second substrate layer 42 that serves as a backup substrate are laminated with a primary adhesive layer 43 interposed therebetween, and a substrate 40 is obtained. The substrate 40 is prepared on a base 51 (substrate preparation step).

Figure 4B:
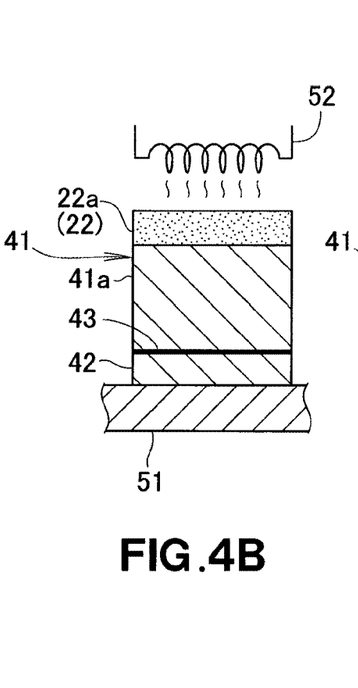

As shown in FIG. 4B, an electrode layer slurry 22*a* comprising carbon that supports a catalyst made of platinum particles or the like, a polymer electrolyte, a solvent, and carbon fiber is prepared and applied on the first substrate layer 41 of the substrate 40. The electrode layer slurry 22*a* is dried in a dryer 52 together with the substrate 40. Thus, the first fuel cell electrode layer 22 is formed on the first substrate layer 41 (electrode layer formation step).

Figure 4C:
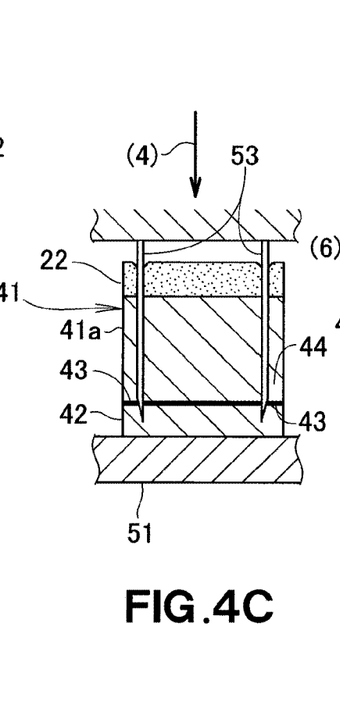

As shown in FIG. 4C, cutting means 53, which is disposed so as to be capable of moving relatively with respect to the base 51, is prepared. The cutting means 53 is made to move as indicated by arrow (4), and cuts from the first fuel cell electrode layer 22 side so as to reach partway through the second substrate layer 42. As a result, predetermined cuts are formed in the first fuel cell electrode layer 22 and the first substrate layer 41 (cutting step).

Figure 4D:
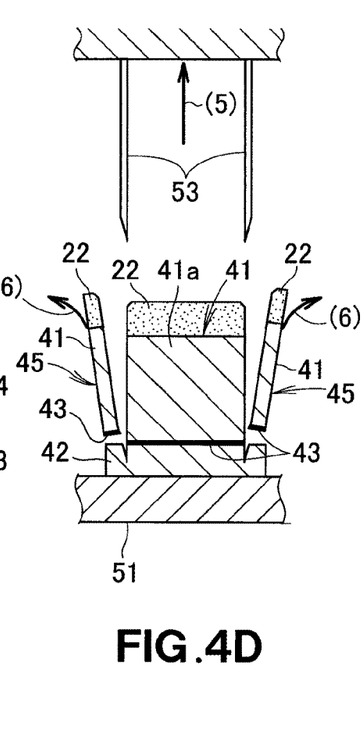

As shown in FIG. 4D, the cutting means 53 is retracted as indicated by arrow (5). Outer side portions 45, 45 of the predetermined shape are peeled off from the second substrate layer 42 as indicated by arrows (6) (removal step). Making the first substrate layer 41 a single layer enables the overall substrate 40 to assume a simple structure.

In the embodiment, the first fuel cell electrode layer 22 and the second fuel cell electrode layer 32 are covered by the first gas diffusion layer 23 and the second gas diffusion layer 33, respectively, but no limitation is presented thereby; the electrode layers 22, 32 may be covered by an adhesive layer formed from a fluorine-containing adhesive.

Obviously, various minor changes and modifications of the present invention are possible in light of the above teachings. It is therefore to be understood that within the scope of the appended claims the invention may be practiced otherwise than as specifically described.

What is claimed is:

1. A method for manufacturing a membrane electrode assembly in which a fuel cell electrode layer is formed on a substrate and transferred to a fuel cell electrolyte membrane, the method comprising:
   a substrate preparation step for preparing the substrate, on which a first substrate layer and a second substrate layer are laminated with a primary adhesive layer interposed therebetween;
   an electrode layer formation step for forming the fuel cell electrode layer on the first substrate layer;
   a cutting step for cutting, using cutting means, from the fuel cell electrode layer side so as to reach the second substrate layer, and forming a cut of a predetermined shape in the fuel cell electrode layer and the first substrate layer;
   a removal step for peeling off an outer side portion of the predetermined shape from the second substrate layer; and
   a transfer step for transferring the fuel cell electrode layer of predetermined shape from the substrate to the fuel cell electrolyte membrane.

2. The method for manufacturing the membrane electrode assembly, according to claim 1, wherein a first auxiliary substrate layer and a second auxiliary substrate layer of the first substrate layer are pasted together with an auxiliary adhesive layer interposed therebetween, and the adhesive strength of the auxiliary adhesive layer is greater than the adhesive strength of the primary adhesive layer.

* * * * *